Nov. 4, 1969  N. E. PONTECORVO  3,476,036
APPARATUS FOR PROCESSING CHEESE CURD INTO HOMOGENEOUS CHEESE
Filed March 13, 1968  5 Sheets-Sheet 1
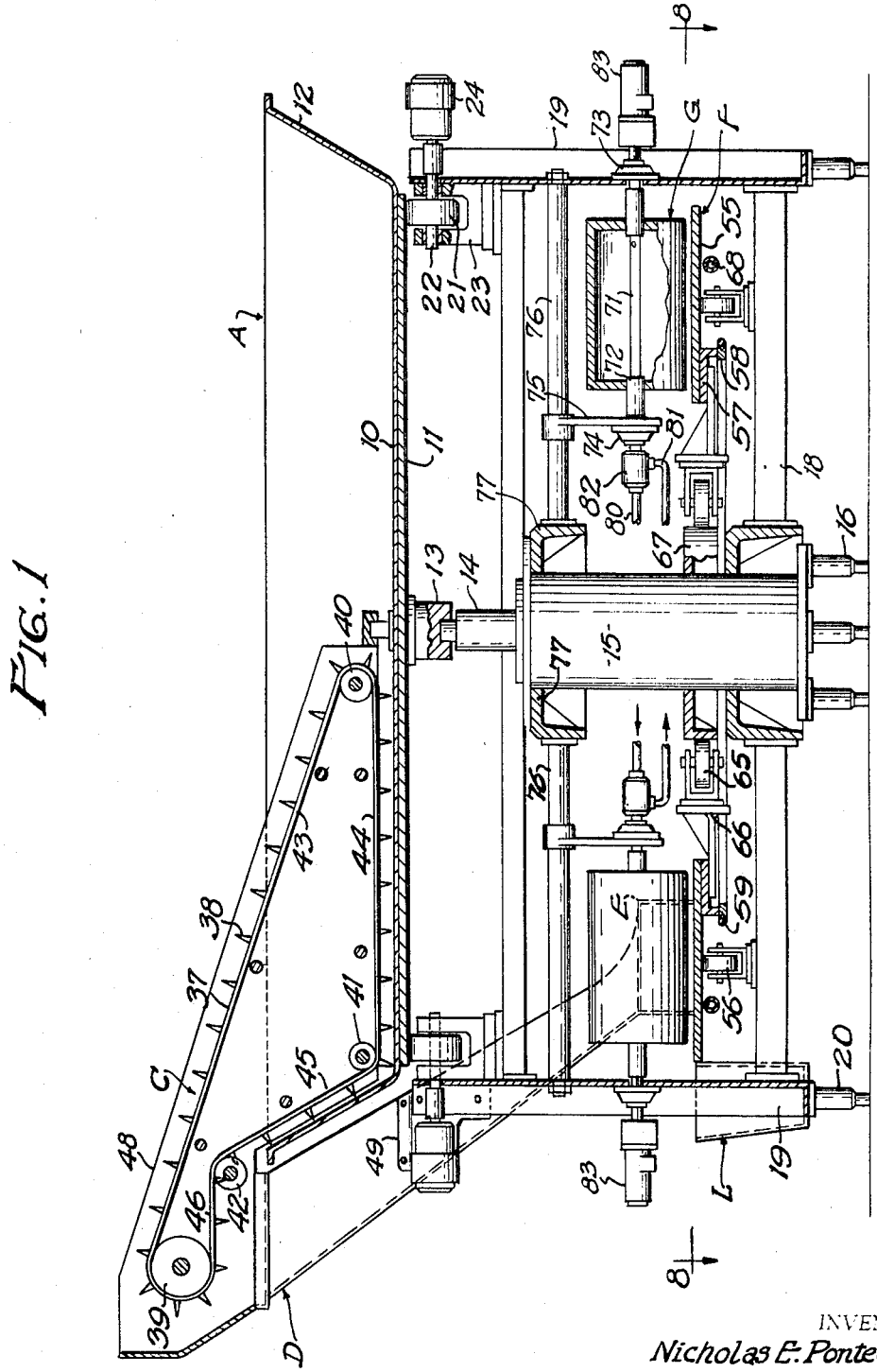
INVENTOR.
*Nicholas E. Pontecorvo*
BY
*Lynn N Latta*
-ATTORNEY-

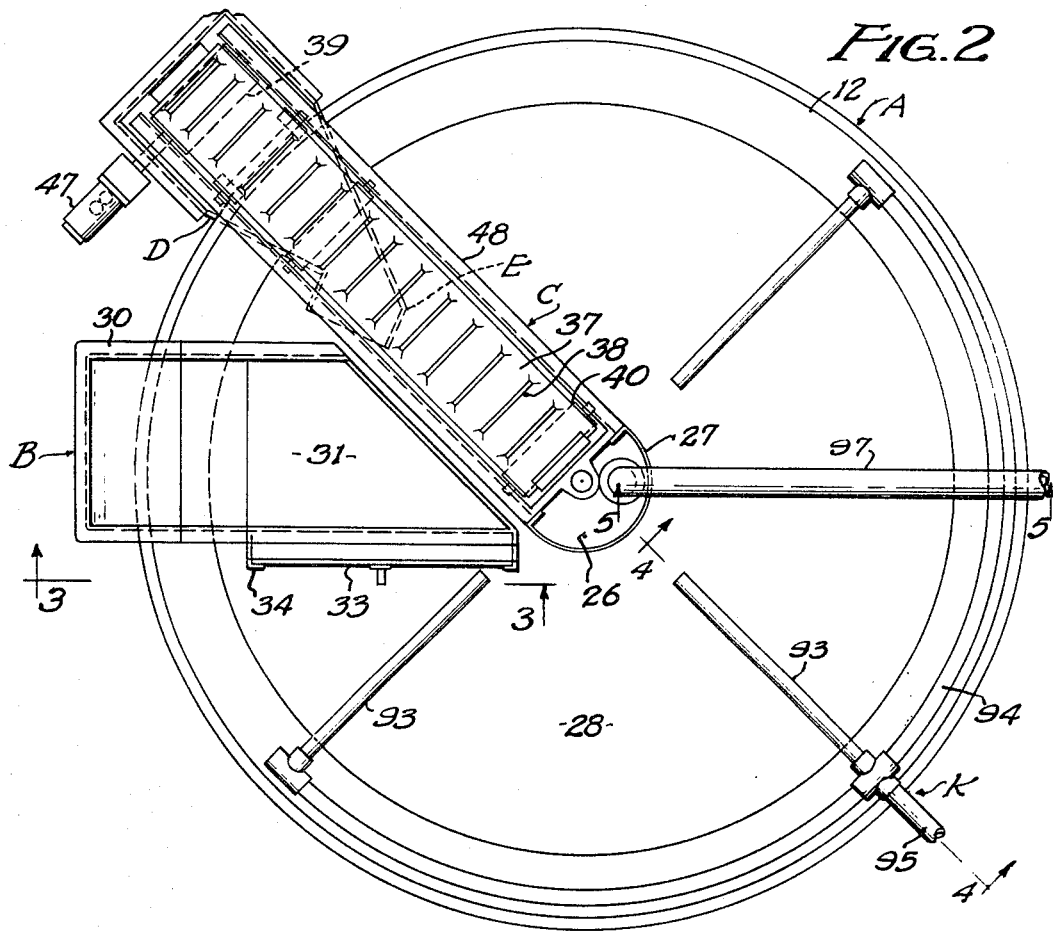
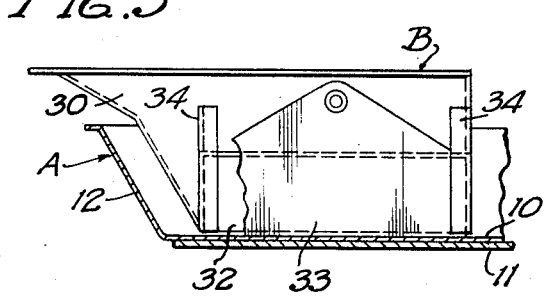
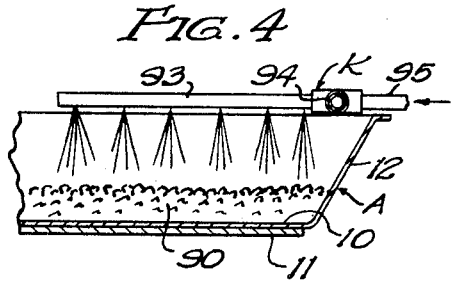
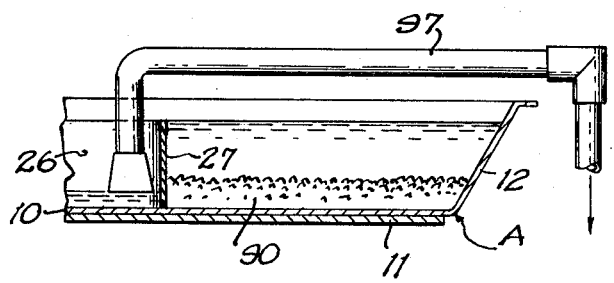
INVENTOR.
Nicholas E. Pontecorvo
BY
Lynn H. Latta
-ATTORNEY- INVENTOR.
BY Nicholas E. Pontecorvo
ATTORNEY Nov. 4, 1969      N. E. PONTECORVO      3,476,036
APPARATUS FOR PROCESSING CHEESE CURD INTO HOMOGENEOUS CHEESE
Filed March 13, 1968      5 Sheets-Sheet 4

INVENTOR.
Nicholas E. Pontecorvo
BY
Lynn W. Latta
—ATTORNEY—

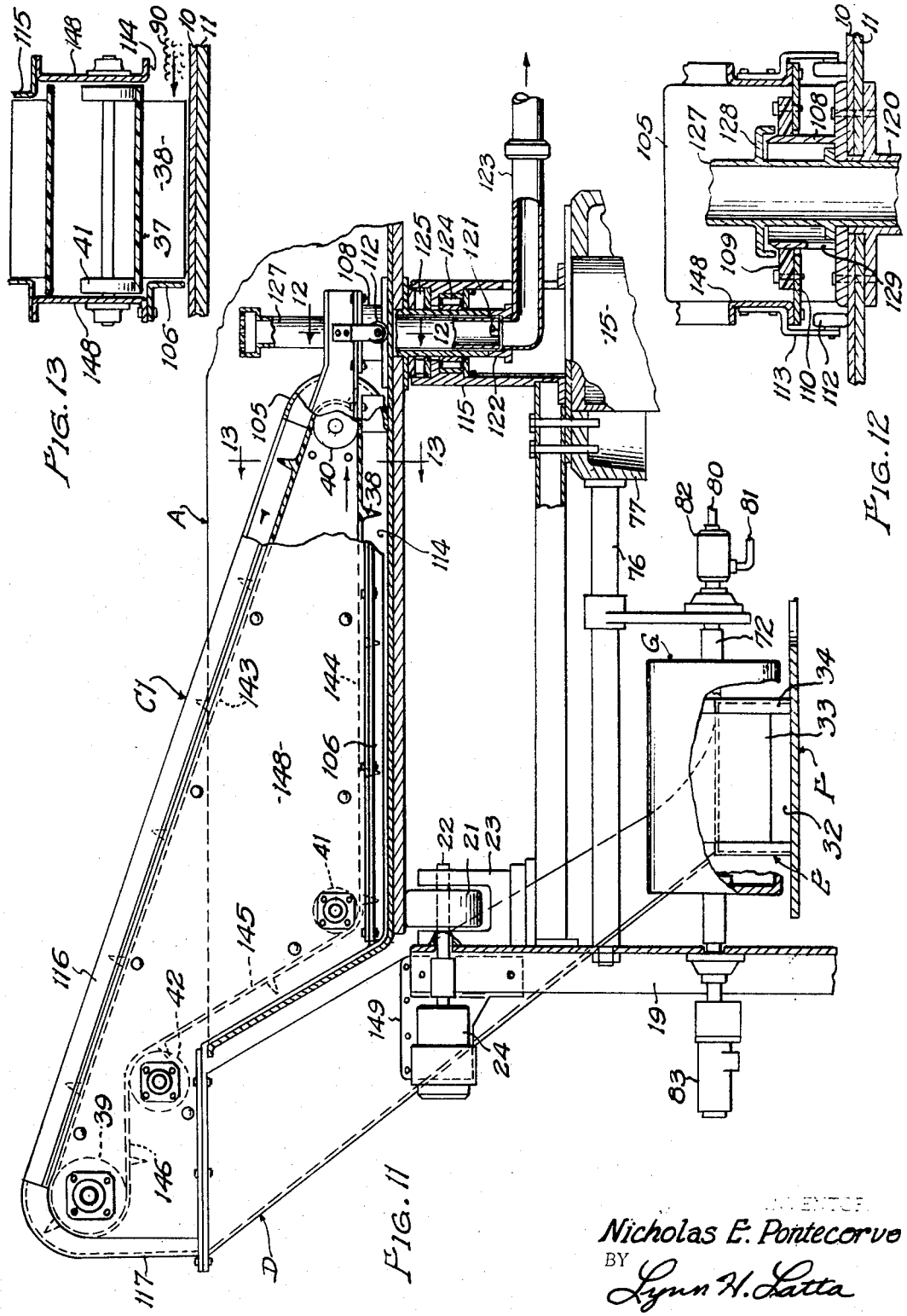

United States Patent Office  3,476,036
Patented Nov. 4, 1969

3,476,036
APPARATUS FOR PROCESSING CHEESE CURD INTO HOMOGENEOUS CHEESE
Nicholas E. Pontecorvo, Tarzana, Calif.
(1548 18th St., Santa Monica, Calif. 90404)
Filed Mar. 13, 1968, Ser. No. 712,715
Int. Cl. A23c *19/12*
U.S. Cl. 99—243          7 Claims

ABSTRACT OF THE DISCLOSURE

A cheese processing machine comprising a cured pre-heating tub disposed above a turntable onto which curd is transferred after being softened in hot water contained in the tub, the turntable carrying a ribbon of curd beneath radially disposed rollers which flatten the ribbon in circumferentially-spaced kneading areas while folding blades fold the ribbon inwardly upon itself in areas between the kneading areas.

BACKGROUND OF INVENTION

Various apparatuses have heretofore been developed for processing cheese curd, including the use of an auger operating within a cylindrical tubular conduit through which the cheese is conveyed; the use of a series of kneading rolls operating over a conveyor belt on which the cheese curd, previously softened by steeping it in hot water, is conveyed; and an apparatus most commonly used in the past, comprising simply a vat in which cheese is stirred in a body of water heated to a temperature of 180° F.

OBJECTS OF THE INVENTION

The general object of the invention is to overcome problems that have been ecountered with the earlier processes and apparatuses. Among these are; the difficulty of attaining uniform distribution of heat in the vat process, and the tendency to overheat portions of a cheese batch, with consequent loss of fat content, while other portions of the batch remain underheated and inadequately softened; the difficulty of maintaining proper operation of the kneading belt in the belt and roll type of apparatus; the complexity and expensive character of such apparatus; and the lack of adequate kneading action in the auger and tube type of apparatus.

SUMMARY OF INVENTION

In achieving the foregoing objects, the invention provides an apparatus in which raw curd in small pieces is fed from a hopper into a large heating tub rotating slowly beneath the hopper, and is laid onto the bottom of the tube in a layer about 3 inches in depth, which is softened by the heating and moistening action of a body of water maintained in the tube at a temperature of approximately 160°. When adequately softened the curd is removed from the tub by a conveyor and dumped down a chute into a hopper from which the curd is metered onto a mixer turntable below the heating tub, on which it is kneaded by radially disposed rolls. After being flattened beneath several rolls, the ribbon of curd on the turntable is folded inwardly upon itself by curd-folding plates, and it is then carried beneath another stage of rollers where it is flattened to a thinner ribbon than before. After traversing a nearly 360° path, it is deflected outwardly by an exit guide shoe and discharged over the periphery of the turntable into a receiver.

Figure 6:
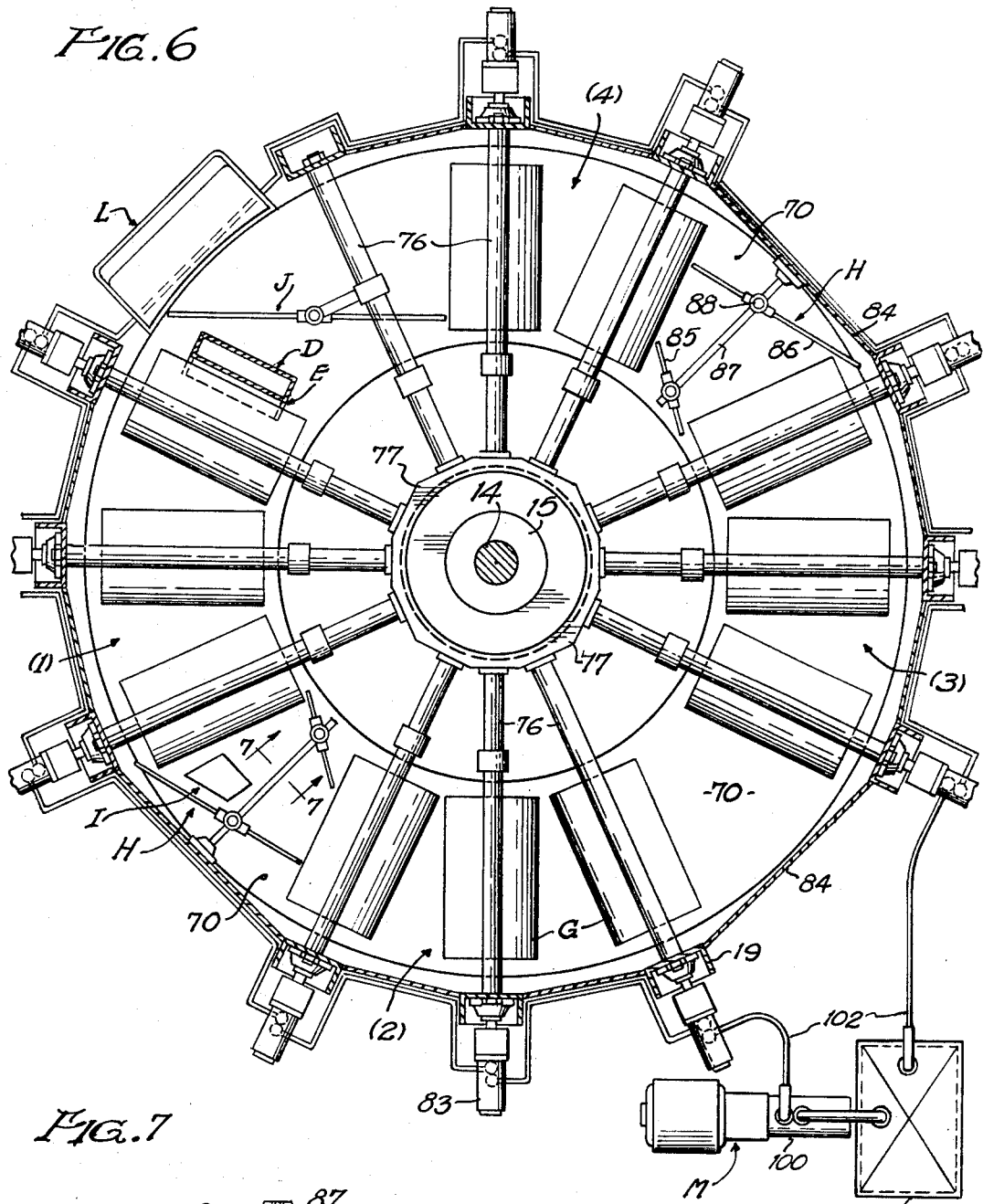
Figure 7:
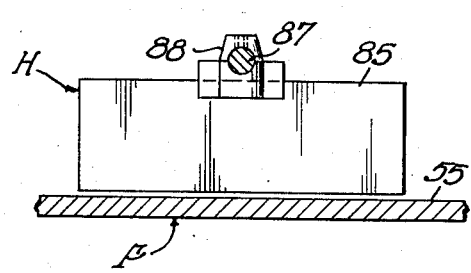
Figure 8:
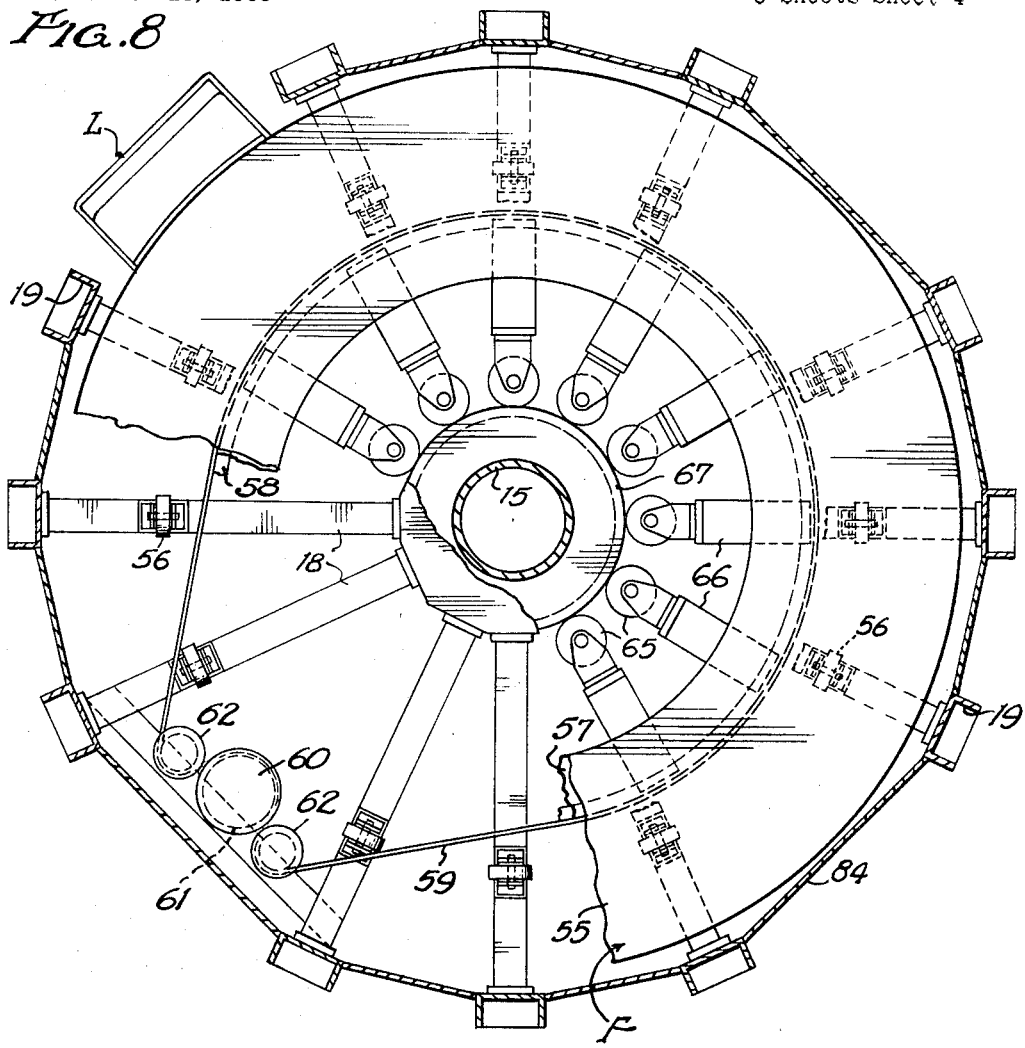
Figure 9:
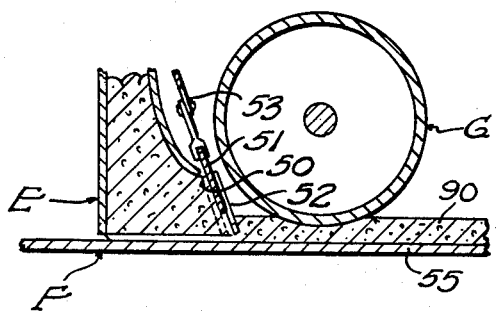
Figure 10:
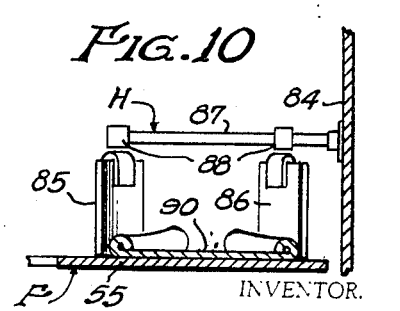

In the drawings:
FIG. 1 is a vertical diametral sectional view of the apparatus;
FIG. 2 is a top plan view of the apparatus;
FIG. 3 is a fragmentary radial sectional view of the pre-heater tub, viewing the flow-control and curd-levelling gate, on line 3—3 of FIG. 2;
FIG. 4 is a fragmentary radial sectional view of the pre-heater tub, viewing a hot water inlet line, on line 4—4 of FIG. 2;
FIG. 5 is a fragmentary radial sectional view of the pre-heater tube, viewing the hot water return line, on line 5—5 of FIG. 2;
FIG. 6 is a horizontal sectional view of the apparatus taken in a plane just below the bottom of the pre-heater tub, showing a plan view of the kneading rolls and turntable;
FIG. 7 is a detail radial sectional view of a curd-folding plate, taken on the line 7—7 of FIG. 6;
FIG. 8 is a horizontal sectional view taken on the line 8—8 of FIG. 1, showing the rotary mixing disc in plan;
FIG. 9 is a detail circumferential vertical sectional view, showing the metering hopper;
FIG. 10 is a detail radial vertical sectional view, illustrating the action of the folding blades;
FIG. 11 is a detail axial sectional view of essential portions of a machine embodying a modified form of the invention;
FIG. 12 is a detail vertical axial sectional view of the center post assembly taken on line 12—12 of FIG. 11; and
FIG. 13 is a detail cross-sectional view of the conveyor, taken on line 13—13 of FIG. 11.

The drawings are largely schematic, especially in FIGS. 1–10.

DESCRIPTION

Referring now to the drawings in detail, and in particular to FIGS. 1–10, I have shown therein, as an example of one form in which the invention may be embodied, a cheese processing machine comprising, in general, a rotatable circular pre-heater tub A for containing a body of hot water in which cheese curd is softened by heat and moisture; a hopper B (FIG. 3) for laying raw curd on the bottom of tub A in a layer of selected depth; a conveyor C for removing the softened curd from the tube after the curd has travelled in a circular path of nearly one revolution of tube A; a chute D into which the softened curd is dropped by the conveyor C; a heated metering hopper E (FIG. 9) at the lower end of the chute D, into which the softened curd is deposited, and from which it flows onto a power-rotated, heated, annular mixer disc F; a series of radially disposed power-driven, heated mixer drums G arranged in circumferentially-spaced groups about the mixer disc F, with graduated spacing of successive groups above the turntable, such that the stream of curd carried by the mixer disc F is successively flattened to increasing thinness; a series of folding blades H disposed in the spaces between the several groups of drums G, for folding the margins of the curd ribbon on the mixer disc; a curd-salting unit I; exit mechanism J for delivering the processed cheese from the machine; a curd-receiver L adjacent the exit; a hot-water circulating and spray delivery system collectively designated K; and a hydraulic driving system M.

Pre-heater tube A (FIGS. 1 and 2) has a flat bottom 10 supported on a turntable 11, and a flaring frusto-conical lateral wall 12. Turntable 11 has a hub 13 functioning as an end bearing and pivoted on a trunnio 14 on the upper end of a center post 15. Post 15 has a base mounted on adjustable levelling legs 16. It forms part of a frame structure including a spider 77 having radiating arms 76 and a plurlity of standards 19 secured to the outer ends of arms 18 and resting on adjustable levelling legs 20.

Tub A is rotatably supported and driven by friction drive wheels 21 having respective shafts 22 journalled in clevises 23 which are mounted on the frame structure at the upper ends of some of the standards 19, at the inner sides thereof. Each wheel 21 is independently driven by a respective hydraulic motor 24. The motors 24 are driven in unison by hydraulic fluid under pressure supplied by a pump in a suitable hydraulic system (not shown).

In the center of tub A is a sump 26 (FIGS. 2 and 5) defined by a wall 27 projecting upwardly from tub bottom 10 to a height below the level of the rim of lateral wall 12. Between the sump wall 27 and the lateral wall 12 there is defined an annular chamber 28 in which a curd-softening hot water bath is maintained by hot water system K.

Hopper B (FIGS. 2 and 3) has a body chute 30 extending radially inwardly over tub rim 12, a bottom opening 31 disposed in a horizontal plane just above tub bottom 10 and extending substantially from the rim to the center of the tub, a delivery mouth 32 in the form of a horizontal slot in its front side, extending approximately radially of the tub for the majority of its radius, for issuing a stream of raw curd that will substantially cover the full bottom area of the tub as the latter rotates, and a gate 33 vertically slidable in suitable ways 34 in the front side of the hopper for starting and stopping the curd flow and for gauging the height of the curd layer.

Conveyor C (FIGS. 1 and 2) comprises an endless flexible element or elements 37, preferably a belt, and a series of conveyor paddles 38 carried thereby and moving in close proximity to the inner surfaces of tub A, for moving the curd. The direction of travel of conveyor C is indicated by arrow. The paddles 38 can be molded integrally with belt 37, and may be arranged to lightly scrape against the surface of tub A in order to remove the curd cleanly from the tub surfaces. The flexible element 37 travels around a drive roller 39 and idler rollers 40, 41 and 42 to provide an entering stretch 43 travelling radially and downwardly to the center and bottom of the hub from the drive roller 39 which is located above and outwardly of the rim, a horizontal stretch 44 travelling radially outwardly along the bottom to move the curd to the lateral wall 12 of the tub, an ascending stretch 45 for moving the curd upwardly along the inner surface of wall 12, and a return stretch 46 extending outwardly to drive roller 39, over the rim of wall 12.

Drive roller 39 is driven by a motor 47 (FIG. 2). Suitable conventional bearing means is provided to support motor 47 and the shafts of rollers 39, 40 and 42. Such bearing means may be embodied in a frame 48 suitably supported from one or more of the frame standards 19 (e.g. by means of bracket arms 49 which can also be utilized to support curd chute D).

Rollers 39–42 are of spool form, comprising a pair of discs mounted in laterally-spaced relation on a bridging shaft, so as to engage marginal portions of belt 37 protruding beyond the ends of paddles 38, which travel between the roller discs as the belt travels over them.

Curd chute D (FIG. 1) is positioned beneath the conveyor C, and has at its upper end a receiving mouth disposed directly beneath the discharge stretch 46 of conveyor C, so as to receive therefrom the curd that is elevated over the rim of lateral wall 12. The chute may be of rectangular tubular form, and is mounted in the frame so as to extend diagonally downwardly and inwardly to an area just above the mixing disc F, where it communicates with and delivers curd into the holding and metering hopper E.

Hopper E (FIG. 9) is in the form of a box which is open at the bottom so that the curd collected therein will rest directly on the upper surface of mixing disc F. It has a discharge side, projecting beneath the first mixing drum G (FIG. 9) which is open to provide a discharge vent 50 the effective height of which is regulated by a gate 51 adapted to open and close the same. Gate 51 is slidable vertically in ways 52, and is actuated by suitable lever mechanism 53. Hopper E is heated by suitable means, not shown (e.g. a hot water jacket).

Mixing disc F (FIGS. 1 and 8) comprises a flat circular ring 55 supported for rotation in a horizontal plane below tub A, by means of support casters 56 mounted on frame spider arms 18. A drive and bracing ring 57 is secured to the underside of disc ring 55 at its inner margin, inwardly of casters 56, and carries a ring sheave 58 through which drive is transmitted to the mixer disc by a cable 59 by engagement with a loop thereof projecting from flanking idler and tensioning sheaves 62.

A plurality of disc-centering rollers 65 are rotatably mounted in fork brackets 66 secured to support ring 57 and extending radially inwardly therefrom. Rollers 65 track on a guide collar 67 encircling and secured to center post 15. This maintains the mixing disc F in concentric relation to the vertical major axis of the machine, and in proper register with the annular series of mixer drums G.

Mixer disc F (FIG. 1) is heated by suitable means such as a gas burner 68 (e.g. of annular form) supported adjacent the disc ring 55 by support means (not shown) attached to the fixed frame and suitably connected to a gas supply (not shown).

Drums G are arranged in groups (1), (2), (3) and (4) consecutively spaced around the circumference of the machine. There are several (preferably three) drums in each group, arranged with their inner ends spaced quite closely together. Between the groups are wider spaces 70 in which the folding blades H are disposed. The layer of curd metered onto mixing disc F by hopper D and carried in a circular path, passes directly beneath group (1), from which it is carried on to group (2) then to group (3), then to group (4), and thence it is exited by guide shoe J.

Drums G are hollow, and have end members rotatably mounted on telescoped inner and outer tubular shafts 71 and 72 which are journalled in bearings 73 and 74 mounted on frame standards 19 and hanger brackets 75 respectively. Brackets 75 are suspended from tubular overarm supports 76 which bridge radially between standards 19 and the annular head 77 carried by central post 15. Hot water for heating the drums is circulated by a manifold system comprising inlet connections 80 to the inner shafts 71 and return lines 81 connected to outer shafts 72 through jackets 82. Hot water is delivered from inner shafts 71 into the outer ends of drums G and flows lengthwise through the drums to their inner ends, where it is discharged into open ends of outer shafts 72 projecting through the inner end members of the drums. Thence it return-flows within outer shafts 72 through bearings 74 and into manifold jackets 82 which deliver it to the return lines 81.

The drums of groups (1), (2), (3) and (4) are spaced above mixer disc F with consecutively closer spacing (narrower gaps), the spacing of the first group (1) providing the widest gaps and the spacing of the last group (4) providing the narrowest gaps.

Drums G are power-driven by respective hydraulic motor 83, each driving the outer end of a respective inner drum shaft 71. Surface speed of the drums is approximately the same as the average circumferential speed of mixer disc F.

A housing (FIG. 6) for the operating mechanism described above is provided by a plurality of wall panels 84 bridging between respective pairs of standards 19, at least some of the panels being detachably secured thereto by suitable means (not shown).

Folding blade units H (FIGS. 6 and 10) each comprise a pair of blades, i.e., a relatively short inner blade 85 and a relatively long blade 86, mounted on an arm 87 anchored to a respective housing plate 84 and projecting horizontally inwardly above mixer disc F. The blades converge circumferentially in the direction of movement of the curd stream 90 carried on disc F, their more widely spaced upstream ends in embracing relation to the adjacent upstream drum G, and their downstream ends being spaced inwardly from the ends of the adjacent downstream drum ("upstream" and "downstream" here referring to the direction of curd movement). The blades 85, 86 are attached to their support arm 87 by vertical axis pivotal fittings 88 which can be loosened so as to permit swinging adjustment of the blades to vary the angle subtended between them, then tightened so as to fix the blades in their positions of adjustment.

The folding blades H have their lower edges disposed in a horizontal plane slightly above the upper surface of mixer disc F, and they are effective to fold both margins of the curd ribbon 90 emerging from one group of drums, inwardly upon the central web of the ribbon (FIG. 10) so as to narrow and thicken the ribbon preparatory to passing under another set of rolls G.

Hot water system K (FIGS. 2 and 4) comprises a plurality of spray pipes 93 (FIGS. 2 and 4) projecting radially inwardly from an arcuate feeder manifold 94 which is supplied with hot water from a suitable source through a supply line 95. The sump 26, which may be associated with the inner end of conveyor C, is continuously drained by a suction line 97 (FIG. 5) which is connected to a suitable pump (not shown) for drawing the water off from the center of preheater tub A at a rate at least as fast as it is supplied by spray pipes 93. Water flows into sump 26 over the upper edge of wall 27, from the annular chamber 28, in which the hot water curd-softening bath is maintained at a depth determined by the height of wall 27, so as to completely cover the layer of curd in the bottom of the tub. Operation of the sprays 93 serves to maintain the bath at a suitable curd-softening temperature, by continuously adding temperature-controlled hot water.

Hydraulic driving system M (FIGS. 1 and 6) includes the motors 83, a motor driven pump 100, a reservoir 101 for hydraulic fluid, and a supply line 102 for circulating the fluid under pressure through the motors 83, returning it through the reservoir to the pump 100 in a closed circuit in which the motors 83 are connected in series.

Driving system M further includes the tub-driving hydraulic motor 24 and the conveyor-drive motor 47, both powered by hydraulic fluid circulated to them by pump 100 and back to reservoir 101 through separate fluid circuits (not shown). Flow control valves may be used in these circuits to adjust their rates of flow in relation to that in the circuit 102 so that the rates of drive to the tub, the conveyor and the drums, may be adjusted for the most efficient operation.

OPERATION

The apparatus provides a continuous cheese-processing operation in which raw cheese curd in small pieces is fed into hopper B so as to maintain therein a body of curd resting on the tub-bottom 10 within the confines of the hopper bottom opening 31. From this hopper-confined body of curd, a stream of curd having a depth regulated by the height-adjustment of gate 33, is drawn by the bottom 16 of rotating tub A. The tub is rotated slowly, at a speed such as to provide a satisfactory time-period for softening the curd in approximately one revolution of the tub. As the curd stream is carried by the tub in a circular path, it forms an annular ring of curd on the tub bottom, commencing at the front of hopper B and extending around to the conveyor C which is located adjacent the back of hopper B. As this curd ring reaches conveyor C, it is moved radially outwardly to the lateral wall 12, elevated along the wall 12, and discharged over the rim of the tub, by the scraping of conveyor paddles 38 along the surfaces of tub bottom 10 and lateral wall 12. The diagonal adjacent side of hopper B functions as a barrier to largely arrest the rotary travel of the ring of curd past the conveyor C. This barrier can be extended to the lateral wall 12 if desired. It will now be apparent that the curd remains in the tub for somewhat less than a full revolution of the tub and is discharged from the tub just short of the position of entry.

As the curd is discharged over the rim of the tub, it will drop into the chute D which will guide it into metering hopper E, the open bottom of which is immediately adjacent the mixing disc F. From this hopper the softened curd is metered onto the revolving heated disc F through the discharge opening 50, beneath metering gate 51 (FIG. 9). The stream of curd carried away from the hopper E will immediately pass under the first mixing drum G, which will compress the loose, softened curd into a ribbon. This ribbon will pass successively beneath the remaining drums of the group, being progressively flattened thereby, and will then be carried between a pair of the folding blades H which will fold over the margins of the ribbon so as to narrow and thicken it. The ribbon will then pass beneath the drums of the second group, again being progressively flattened, and upon emerging therefrom, will again be folded back upon itself by a second pair of folding blades H. These stages of alternate flattening and folding will be repeated until the ribbon approaches the back of metering hopper E after nearly a complete revolution of mixing disc F. The ribbon then will be deflected off the disc F by the diagonlly positioned exit guide shoe J, into the curd receiver L.

While passing from mixing drum group (1) to group (2), the curd is salted by salting unit I (FIG. 6).

FIG. 11 discloses a preferred form of the invention embodying a conveyor C1 wherein the several stretches 143, 144, 145 and 146 travel in directions opposite to the travel of corresponding stretches 43, 44, 45 and 46 of conveyor C, and including a scoop 105 at the inboard end of the conveyor (adjacent the center of the tub). Scoop 105 has a segmental-cylindrical inner surface conforming to the path of travel of the tips of paddles 38 as they swing upwardly around idler roller 40 and spaced therefrom very slightly, just enough to avoid dragging contact of the paddles against the scoop. In the operation of conveyor C1, the lower stretch 144 travels radially inwardly from the lateral wall of tub A, gathering the curd along the upstream side of a barrier plate 106 on the downstream side of the conveyor in relation to the movement of the curd on the turntable, and moving it toward the center of the tub to the scoop 105, which guides the curd upwardly onto the upper stretch 143. The curd is carried by the upper stretch 143 radially outwardly and over the tub rim, and discharged into chute D. During a majority of its outward travel the stretch 143 travels above the level of the softening bath in tub A and during that portion of the travel, water entrained in the curd will drain from the sides of the conveyor belt 37 so that the curd delivered into chute D will not contain an excess amount of water.

Conveyor C1 includes a pair of side frame members 148 (e.g. channel members) which have their inboard ends in straddling relation to a pivot collar 108 and bridged by a cross-plate 110 having an aperture through which the pivot collar 108 projects. A pivot bearing washer 109 of plastic material (e.g. nylon) is carried by cross-plate 110 and circles the collar 108, in rotatable bearing contact therewith, to center the inboard end of the conveyor on the axis of rotation of the tub. This end of the conveyor is supported by a pair of rollers 112 mounted thereto by brackets 113 and in rolling contact with the tub bottom 10 at points located on a diameter thereof. The outer end of the conveyor is supported on and attached to the upper end of curd chute D, which is supported by a bracket or brackets 149 attached to one or more frame standards 19.

On the upstream side of the conveyor, the lower side of the frame channel 148 is spaced above the tub bottom for the full radius of the tub bottom outwardly of scoop 105, thus providing an opening 114 for the entry of cheese curd beneath the conveyor. On the opposite side, the baffle 106 will arrest and hold back the curd for substantially the full radius of the tub bottom, whereby all of the curd entering beneath the conveyor will be swept inwardly and upwardly onto the upper stretch 143. The curd carried by upper stretch 143 will be confined thereon by a cover channel 116 which may be of hat-section, attached to the upper flanges of frame channels 148. An outer end cover 117 may also be utilized, to complete the enclosure of the conveyor belt and to provide housed communication with chute D.

Conveyor rollers 39, 40, 41 and 42 have shafts journalled in respective bearings, as indicated, on the respective side frame channels 148.

The overflow sump, in this construction, comprises a tube 127 extending through the bottom of the tub, received in a hub sleeve 120 which is secured in the bottom of the tub, and having at its lower end a bayonet-type locking connection 121 to a fixed socket 122 in the center of post 115. Socket 122 forms part of an elbow on the inner end of a drain pipe 123 projecting through the side of post 115 and leading to waste. By unlocking bayonet connection 121, overflow tube 127 can be removed for cleaning.

Hub sleeve 120 is rotatably mounted in a centering bearing 124 and end-thrust bearing 125 in post 115, providing an antifriction pivot on which tub A is mounted for rotation.

Overflow tube 127 has, intermediate its ends, a flange 128 which overhangs the upper end of collar 108 to provide a restraining abutment which will prevent any upward tilting of the inner end of conveyor C1 if it should tend to do so.

Collar 108 is provided with one or more drain openings 129 for draining the tub. The collar and hub sleeve 120 have respective integral flanges which are bolted together in a unit assembly with the tub, the bottom 10 and turntable 11 being clamped between the flanges with suitable seals (not shown) interposed.

In operation, the tub, collar and hub sleeve assembly rotates while the conveyor C1 is held in a fixed position by its fixed outer end mounting, the casters 112 on its inner end rolling against the bottom of the tub as the latter turns. Hub sleeve 120 turns within center post 115 and revolves around overflow tube 127, which remains stationary. The handling of the cheese is the same as in FIGS. 1–10. Parts numbered the same as in FIGS. 1–10 are similar parts. The remainder of the machine (not shown) is the same as in FIGS. 1–10.

I claim:
1. A cheese processing machine comprising:
an elevated rotatable tub;
means to deliver into the hub, a stream of raw curd in the form of an annular flat ribbon;
means to soften said curd stream in the tub;
means to gather said curd stream at the end of approximately one revolution of travel, and to transfer it to a lever beneath the tub;
a rotatable annular mixer disc beneath the tub, onto which the curd is deposited by said gathering means, in the form of an annular ribbon;
means for rotating said tub and said mixer disc; and
a plurality of mixer drums in annular array in close spacing above said mixer disc, mounted for rotation on fixed axes radiating from the axis of said mixer disc, in the path of movement of said curd ribbon on said mixer disc, for kneading said ribbon.

2. A processing machine as defined in claim 1, wherein said curd delivering means is a hopper having a discharge mouth extending radially of the tub adjacent the bottom thereof.

3. A processing machine as defined in claim 1, wherein said curd-softening means comprises a plurality of hot water spray heads extending radially inwardly over said tub in circumferentially spaced array, for spraying hot water onto the curd in the tub.

4. A processing machine as defined in claim 1, wherein said curd-softening means comprises;
a sump at the center of the tub, extending upwardly from the bottom thereof and defining outwardly thereof an annular chamber in which said annular stream of raw curd is deposited;
means for injecting hot water into said annular chamber to provide a hot water bath in which the curd is steeped, excess water overflowing into said sump.

5. A processing machine as defined in claim 1, wherein said mixer drums are arranged in circumferentially spaced groups, and including
pairs of converging folding blades disposed adjacent the bottom of the tub in the spaces between said groups, for folding the margins of the curd ribbon inwardly upon the body thereof, to narrow and thicken the ribbon.

6. A processing machine as defined in claim 1, wherein said curd gathering and transferring means comprises:
a conveyor for moving the curd in said tub outwardly and over the rim of the tub;
a transfer chute for receiving the curd below the rim of the tub and guiding it downwardly;
and a metering hopper at the lower end of said chute, for metering the curd onto said mixing disc in a layer of selected depth.

7. A processing machine as defined in claim 1, wherein said curd gathering and transferring means comprises;
a conveyor including a lower stretch travelling radially inwardly along the bottom of the tub for gathering the curd, an upwardly swinging loop near the center of the tub, and an upper stretch returning radially outwardly from said loop and over the rim of the tub, for delivering the curd out of the tub.

References Cited
UNITED STATES PATENTS
3,403,030   9/1968   Pontecorvo et al. __ 99—243 XR WALTER A. SCHEEL, Primary Examiner JOHN M. BELL, Assistant Examiner U.S. Cl. X.R.
31—46; 99—116